Nov. 19, 1935.   A. W. MALL   2,021,241
QUICK DETACHABLE COUPLING
Filed Dec. 24, 1934
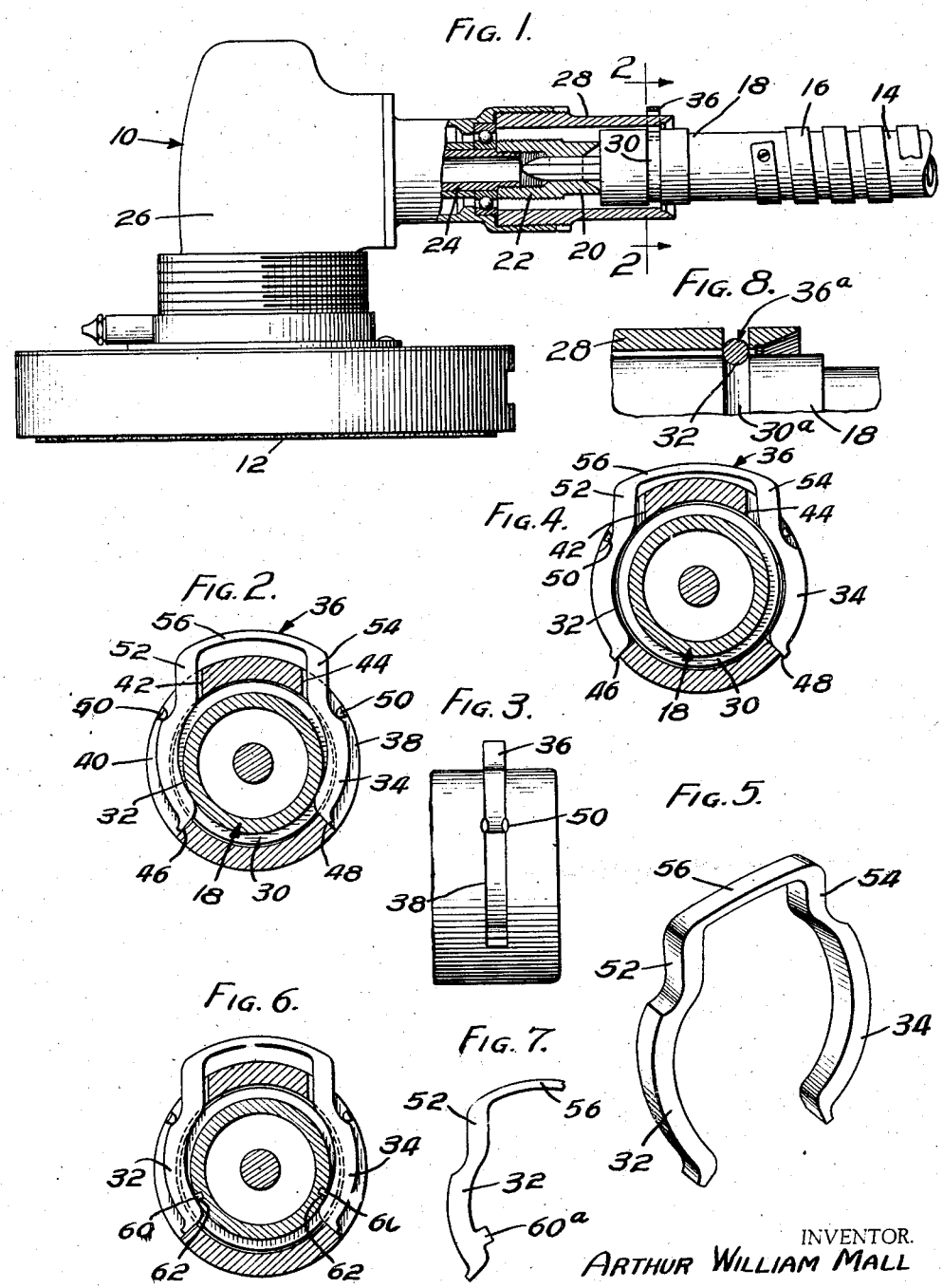
INVENTOR.
ARTHUR WILLIAM MALL
BY
Harry H. Hitzeman
ATTORNEY.

Patented Nov. 19, 1935

2,021,241

UNITED STATES PATENT OFFICE 2,021,241

QUICK DETACHABLE COUPLING

Arthur William Mall, Chicago, Ill.

Application December 24, 1934, Serial No. 759,032

10 Claims. (Cl. 285—161)

My invention relates to improvements in couplings and like devices.

My invention relates more particularly to improvements in couplings of the quick-detachable or attachable type.

My invention relates to the type of couplings which are primarily employed for attaching flexible shafting to tools to be driven by the flexible shaft, although as the description develops it will be clearly seen that the same may be employed with equal benefit in a great many other and different situations and in connection with a great many different types of mechanisms.

The principal object of my invention is to provide an improved quick coupling member of the type described.

A further object is to provide an improved type of swivel coupling.

A further object is to provide an improved coupling member capable of simple manipulation to connect together or detach a pair of telescoping members.

A further object is to provide a coupling member of the type dscribed capable of making a swivel connection or by a slight modification of a non-swivel connection as desired.

A further object is to provide a simple inexpensive coupling construction that is not easily broken or damaged, one that is easily understood and quickly operated and capable of long life and hard use.

Other objects and advantages will be more apparent from the following description wherein reference is had to the accompanying sheet of drawings upon which Fig. 1 is a side elevational view with parts broken away in section of a portable grinding tool and a flexible shaft connected thereto;

Fig. 2 is a vertical sectional view at the connection and is taken on the lines 2—2 of Fig. 1;

Fig. 3 is a fragmentary side view of the coupling collar of the grinding tool with the lock member in position thereon;

Fig. 4 is a sectional view similar to Fig. 2 with the lock member in an expanded position so that the flexible shaft may be disconnected from the coupling collar;

Fig. 5 is a view in perspective of the lock member;

Fig. 6 is a sectional view similar to Fig. 2 of a modified form thereof in which means are provided to prevent relative rotary movement between the shaft collar and the coupling collar.

Fig. 7 is a fragmentary view of the same type of lock member shown in Fig. 6; and Fig. 8 is a fragmentary section at the lock member and groove showing a modified lock member and construction whereby the shaft connection can automatically be pulled apart at a predetermined tension.

In the embodiment of the invention illustrated in the drawing I provide a power tool such as a grinding wheel 10 which is adapted to have its grinding disc 12 driven through suitable mechanism forming flexible shaft 14. The flexible shaft 10 may be of well-known type ordinarily formed with and exterior enclosing hose member 16, shaft casing collar 18 and a rigid shaft end 20 formed with suitable slots and spines to connect with drive nut 22 suitably connected with the end of a bevel 15 pinion 24 which meshes with a bevelled gear in the housing 26 to drive the grinding disc 12. The shaft casing collar 18 of the flexible shaft is adapted to be telescopically inserted in the end of a coupling collar 28 secured to the end of housing 26. The shaft casing collar 18 is formed with a circumferential groove 30 into which the extended arms 32 and 34 of a spring lock member 36 are adapted to engage to prevent the withdrawal of the flexible shaft.

The lock member 36 may be positioned in a pair of slots 38 and 40 milled or otherwise formed in the side walls of coupling collar 28. The upper shoulders 42 and 44 of these slots may be vertical as shown and the lower shoulders 46 and 48 may be outwardly sloped as shown. By peaning or otherwise deforming the edges of slots 38 and 40, a pair of abutments 50 are provided to hold the lock member in position in the slots.

The lock member may be formed from a straight piece of spring steel and shaped as shown with the arcute arm portions and with lateral extensions 52 and 54 extending upwardly therefrom and connected by a comparatively thin arcuate portion 56.

The operation of the spring lock member will now be explained. With the same assembled as described upon the coupling collar 28, when the collar 18 of a flexible shaft is inserted the spring member has its arms expanded by pressure upon the portion 56 thereof. This is due to the abutment of the lower ends thereof against the outwardly sloping shoulders 46 and 48 of the slots. Thus when the same is expanded to the position shown in Fig. 4 it can be seen that the collar 50 of the flexible shaft can easily be inserted. Removal of pressure upon the portion 56 will at once permit the arms 32 and 34 to snap into position in the groove 30, thus giving a secure swivel connection between the parts. It will further be obvious that only by direct pressure upon the portion 56 to spread arms 32 and 34 apart will it be possible to withdraw the shaft from the tool.

In Fig. 6 I have illustrated a modified form of the invention in which I provide a pair of pin members 60 secured to the inner walls of arms 32 and 34 and adapted to enter complementary openings 62 in the shaft casing collar 18. With this construction it is believed to be clear that a non-swivel connection or one in which there is no relative rotary movement between the parts, has been provided.

In Figure 7 I have illustrated a further modified form of lock member similar to that shown in Figure 6 excepting however that the members 60a which take the place of pin members 60 are formed integrally with the lock member.

It is sometimes desirable to vary the cross section of the groove and the locking member so that the connection can be pulled apart if desired. One form of this construction is shown in the fragmentary view Figure 8. In this view I have shown the groove 30a hemi-spherical in contour and of a depth slightly less than the diameter thereof. I have also shown the lock member 36a having a circular cross section and so positioned in slots 38 and 40 that the pre-determined pull upon the shaft 14 will press the spring member outwardly and thus release the connection. This feature is my invention providing as it does, an automatic disconnecting means under certain conditions is considered important because of the safety feature thereof. It may frequently happen that the flexible shaft or other parts are being strained by too great a pull upon the driven tool and if it were not for this type of connector, the shaft or other more expensive parts would become broken. Accordingly this lock member is so constructed that after the pre-determined pull, the same will automatically disengage the shaft from the driven tool.

While I have illustrated and described my improved coupling device in connection with the use of a flexible shaft with tools to be driven thereby, it will of course be understood that the use of the same is obviously not limited in any manner by this disclosure. In its generic thought, my invention embodies the provision of a quick-detachable connection between telescopically engageable parts for any and all purposes. I contemplate that changes and modifications may be made in the exact details shown and I do not wish to be limited in any particular; rather what I desire to secure and protect by Letters Patent of the United States is:

1. A coupling device of the class described comprising a coupling collar, said collar having a pair of slots therein on opposite sides of the center thereof, a resilient lock member adapted to be positioned in said slots, shoulders at the end of said slots for spreading apart opposite walls of said lock member means for holding said lock member in said slot and a shaft collar having a circumferential groove in its outer surface adapted to be telescopically inserted into said coupling collar so that in a coupled position the sides of said lock member rest in said circumferential groove to effect a swivel connection and whereby an unlocking movement is caused by pressing on the top of said spring member thereby spreading its opposite walls apart to disengage said groove.

2. The combination of a cylindrical collar, said collar having a pair of arcuately shaped slots therein in the same plane but upon opposite sides thereof and an open-ended spring lock member formed with a pair of arcuate arm portions, a pair of extensions therefrom and a resilient connector portion therebetween, said lock member positioned and movably held in said slots with the ends of its arm portions resting against the lower ends of said slots and capable in this position of engaging behind a shoulder or in a groove of a member telescopically inserted into said collar to couple the same together.

3. The combination of a cylindrical collar and a member telescopically inserted therein, said collar having a pair of arcuately shaped slots therein in the same plane but upon opposite sides thereof, an open-ended spring lock member formed with a pair of arcuate arm portions, a pair of extensions therefrom and a resilient connector portion therebetween, said lock member positioned and movably held in said slots with the ends of its arm portions resting against the lower ends of said slots and capable in this position of engaging behind a shoulder or in a groove of said member telescopically inserted into said collar to couple the same together and form a swivel connection.

4. The combination of a cylindrical collar and a member telescopically inserted therein said collar having a pair of arcuately shaped slots therein upon opposite sides thereof, an open-ended lock member formed with a pair of arcuate arm portions, each of said arm portions having a pin thereon, a pair of extensions from said arm portions and a resilient connector portion therebetween, said lock member positioned and movably held in said slots with the ends of its arm portions resting against the lower ends of said slots and capable in this position of engaging behind a shoulder or in a groove of said member telescopically inserted into said collar to couple the same together, said pins adapted to engage openings in said member to prevent relative rotation between said collar and said member.

5. A lock member of the class described formed of a straight piece of steel and bent to provide a yoke member having a pair of arcuate arm portions, lateral extensions therefrom and a comparatively thin arcuate connector portion therebetween, said connector portion sufficiently resilient so that the arm portions may be forced apart to release the same from engagement with a member insertable therebetween.

6. A lock member of the class described formed of a straight piece of steel and bent to provide a yoke member having a pair of arcuate arm portions, lateral extensions therefrom and a comparatively thin arcuate connector portion therebetween, said connector portion sufficiently resilient so that the arm portions may be forced apart to release the same from engagement with a member insertable therebetween, and an inwardly directed pin member secured to each of said arm portions.

7. The combination with an operating tool having a coupling collar thereon, said collar having a pair of slots therein on opposite sides of the center thereof, a resilient lock member adapted to be positioned in said slots, means associated with said slots for spreading apart opposite walls of said lock member, and a shaft collar having a groove in its outer surface adapted to be telescopically inserted into said coupling collar so that in a coupled position the sides of said lock member rest in said groove and whereby an unlocking movement is caused either by pressing on the top of said spring member thereby spreading its opposite walls apart to disengage said groove, or by a pull of a pre-determined amount upon either said coupling collar or said shaft collar.

8. The combination with a member having a coupling collar thereon, said collar having a pair of slots therein on opposite sides of the center thereof, an open-ended spring member adapted to be positioned with its extended ends resting in said slots, a pair of outwardly sloped shoulders at the lower end of said slots against which the lower ends of said lock member normally rest, and a shaft casing collar having a circumferential groove in its outer surface adapted to be telescopically inserted into said coupling collar so that in a coupled position the sides of said lock member rest in said circumferential groove.

9. The combination with a member having a coupling collar thereon, said collar having a pair of slots therein on opposite sides of the center thereof, a resilient lock member adapted to be positioned in said slots, means associated with said slots for spreading apart opposite walls of said lock member, and a shaft casing collar having a groove in its outer surface adapted to be telescopically inserted into said coupling collar so that in a coupled position the sides of said lock member rest in said groove and whereby an unlocking movement is caused by pressing on the top of said spring member thereby spreading its opposite walls apart to disengage said groove.

10. A coupling device of the class described comprising a coupling collar, said collar having a pair of slots therein on opposite sides of the center thereof, a resilient lock member adapted to be positioned in said slots, shoulders at the end of said slots for spreading apart opposite walls of said lock member, means for holding said lock member in said slot and a shaft collar having a circumferential groove in its outer surface adapted to be telescopically inserted into said coupling collar so that in a coupled position the sides of said lock member rest in said circumferential groove to effect a swivel connection.

ARTHUR WILLIAM MALL.